(12) United States Patent
Lee

(10) Patent No.: US 11,642,929 B2
(45) Date of Patent: May 9, 2023

(54) APPARATUS AND METHOD FOR CONTROLLING DAMPING FORCE THROUGH ROAD FREQUENCY CLASSIFICATION

(71) Applicants: Hyundai Motor Company, Seoul (KR); Kia Motors Corporation, Seoul (KR)

(72) Inventor: Min Su Lee, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 407 days.

(21) Appl. No.: 16/996,555

(22) Filed: Aug. 18, 2020

(65) Prior Publication Data
US 2021/0331548 A1    Oct. 28, 2021

(30) Foreign Application Priority Data

Apr. 27, 2020 (KR) ........................ 10-2020-0050811

(51) Int. Cl.
*B60G 17/0165* (2006.01)
(52) U.S. Cl.
CPC .... *B60G 17/0165* (2013.01); *B60G 2400/821* (2013.01); *B60G 2400/822* (2013.01); *B60G 2400/91* (2013.01)
(58) Field of Classification Search
None
See application file for complete search history.

(56) References Cited

U.S. PATENT DOCUMENTS

| 4,770,438 A * | 9/1988 | Sugasawa ........ B60G 17/01941 188/266.7 |
| 5,555,173 A * | 9/1996 | Campbell ............ B60G 17/016 701/37 |
| 6,412,788 B1 * | 7/2002 | Ichimaru ............ B60G 17/0165 280/5.515 |

FOREIGN PATENT DOCUMENTS

| JP | H04-038215 A | 2/1992 |
| KR | 10-2017-0007043 A | 1/2017 |

* cited by examiner

*Primary Examiner* — Navid Z. Mehdizadeh
(74) *Attorney, Agent, or Firm* — Morgan, Lewis & Bockius LLP

(57) ABSTRACT

An apparatus of controlling damping force through road frequency classification may include high pass filters configured to perform high-pass filtering of detecting values of wheel vibration input from wheel vibration sensors according to different cutoff frequencies, a main frequency extraction module configured to determine a main frequency of the wheel vibration based on filtered values output from the high pass filters, a maximum amplitude and amplitude ratio extraction module configured to determine a maximum amplitude and an amplitude ratio of the wheel vibration based on the filtered values, a road gripping force control determination module configured to determine whether or not road gripping force is to be controlled based on the determined main frequency and the determined maximum amplitude and amplitude ratio, and a damper control module configured to determine the damping force of dampers of a vehicle based on results of determination and road roughness.

19 Claims, 9 Drawing Sheets

APPARATUS AND METHOD FOR CONTROLLING DAMPING FORCE THROUGH ROAD FREQUENCY CLASSIFICATION

CROSS-REFERENCE TO RELATED APPLICATION

The present application claims priority to Korean Patent Application No. 10-2020-0050811, filed on Apr. 27, 2020, in the Korean Intellectual Property Office, the entire contents of which is incorporated herein for all purposes by this reference.

BACKGROUND OF THE INVENTION

Field of the Invention

The present invention relates to an apparatus and method for controlling damping force through road frequency classification, and more particularly to an apparatus and method for controlling damping force which may classify a road frequency using information detected through wheel vibration sensors provided at wheels of a vehicle to detect the longitudinal acceleration of the wheels, and appropriately control the damping force of dampers of the vehicle based on the classified road frequency, to improve the riding comfort of the vehicle and the road gripping force thereof.

Description of Related Art

An electronically controlled suspension ECS, which is currently applied to vehicles, have dampers configured to control vibration of springs vibrating when an impact occurs due to a speed bump, rapid acceleration, rapid deceleration, cornering, etc., to relieve the impact transmitted from a road to a vehicle body to improve riding comfort.

As one of conventional damper control techniques, there is a known sky-hook control method, in which the longitudinal acceleration of a vehicle body and the longitudinal acceleration of wheels are detected using body vibration sensors provided on the vehicle body and wheel vibration sensors provided at the wheels, the longitudinal speed of the vehicle body and the longitudinal speed of the wheels are derived by integrating the respective detected longitudinal accelerations, and the damping force of dampers is controlled based on a difference between the longitudinal speed of the vehicle body and the longitudinal speed of the wheels.

However, the present sky-hook control-based damper control technique is realized based on driving on a smooth road, such as a paved road, and thus, when a vehicle is driven on a rough road, the riding comfort or the road gripping force of the vehicle may deteriorate. For example, a vehicle aiming to perform dynamic and high-speed driving maintains a hard state, in which the damping force of dampers is decreased. In the instant case, the present damper control technique is advantageous in optimizing handling and vehicle motion control on a smooth road, but may deteriorate riding comfort and the road-gripping force of the vehicle on a rough road, thus leading to instability of vehicle driving.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and method for controlling damping force which may classify a road frequency using information detected through wheel vibration sensors provided at wheels of a vehicle to detect the longitudinal acceleration of the wheels, and control the damping force of dampers of the vehicle to be appropriate for a road surface condition based on the classified road frequency, to improve both the riding comfort of the vehicle and the road gripping force thereof.

In accordance with various aspects of the present invention, the above and other objects may be accomplished by the provision of an apparatus of controlling damping force through road frequency classification, including a plurality of high pass filters configured to perform high-pass filtering of detecting values of wheel vibration input from wheel vibration sensors according to different cutoff frequencies, a main frequency extraction module configured to determine a main frequency of the wheel vibration based on a plurality of filtered values output from the high pass filters, a maximum amplitude and amplitude ratio extraction module configured to determine a maximum amplitude and an amplitude ratio of the wheel vibration based on the filtered values output from the high pass filters, a road gripping force control determination module configured to determine whether or not road gripping force is to be controlled based on the determined main frequency of the wheel vibration and the determined maximum amplitude and amplitude ratio of the wheel vibration, and a damper control module configured to determine the damping force of dampers of a vehicle based on results of determination by the road gripping force control determination module and a road roughness.

The main frequency extraction module may include a plurality of zero cross counters, each of which is configured to count a number of times that a filtered value output from a corresponding one of the high pass filters crosses zero '0', a plurality of integrators, each of which is configured to cumulatively sum a count number, acquired by counting the number of times by a corresponding one of the zero cross counters, for a predetermined sampling time, a plurality of count sum output units, each of which is configured to update and output a count sum, acquired by cumulatively summing the count number by a corresponding one of the integrators, each sampling time, a body resonance region sum calculator configured to sum count sums corresponding to a body resonance region of the vehicle, among the count sums output from the plurality of count sum output units, a wheel resonance region sum calculator configured to sum count sums corresponding to a wheel resonance region of the vehicle, among the count sums output from the plurality of count sum output units, and a main frequency calculator configured to derive the main frequency of the wheel vibration based on a difference between a sum of the count sums corresponding to the body resonance region of the vehicle and a sum of the count sums corresponding to the wheel resonance region of the vehicle.

The main frequency calculator may derive the main frequency by dividing the difference between the sum of the count sums corresponding to the body resonance region and the sum of the count sums corresponding to the wheel resonance region by double the predetermined sampling time.

The maximum amplitude and amplitude ratio extraction module may include a plurality of absolute value calculators, each of which is configured to determine an absolute value of a corresponding one of the filtered values, a plurality of maximum value calculators, each of which is configured to determine a maximum value of the absolute value determined by a corresponding one of the absolute value calculators, a plurality of maximum value determiners, each of which is configured to update and output a maximum value determined by a corresponding one of the maximum value calculators every predetermined sampling time, a body resonance region sum calculator configured to sum maximum values corresponding to a body resonance region of the vehicle, among the maximum values output from the maximum value determiners, a wheel resonance region sum calculator configured to sum maximum values corresponding to a wheel resonance region of the vehicle, among the maximum values output from the maximum value determiners, a maximum amplitude calculator configured to determine the maximum amplitude of the wheel vibration based on a difference between a sum of the maximum values corresponding to the body resonance region of the vehicle and a sum of the maximum values corresponding to the wheel resonance region of the vehicle, and an amplitude ratio calculator configured to determine the amplitude ratio of the wheel vibration based on a ratio of the sum of the maximum values corresponding to the body resonance region of the vehicle to the sum of the maximum values corresponding to the wheel resonance region of the vehicle.

The road gripping force control determination module may determine that the road gripping force is to be controlled, when the main frequency of the wheel vibration determined by the main frequency extraction module is greater than a first predetermined reference value, the maximum amplitude of the wheel vibration determined by the maximum amplitude and amplitude ratio extraction module is smaller than a second predetermined reference value and the amplitude ratio of the wheel vibration determined by the maximum amplitude and amplitude ratio extraction module is greater than a third predetermined reference value.

The damper control module may change the damping force of the dampers to a hard state in which the damping force is decreased, when the road gripping force control determination module determines that the road gripping force is to be controlled and the road roughness is greater than a fourth predetermined reference value.

The damper control module may change the damping force of the dampers to the hard state in which the damping force is decreased, when the road gripping force control determination module determines that the road gripping force is not to be controlled and the road roughness is not greater than the fourth predetermined reference value.

The damper control module may change the damping force of the dampers to a soft state in which the damping force is increased, when the road gripping force control determination module determines that the road gripping force is not to be controlled and the road roughness is greater than the fourth predetermined reference value.

In accordance with another aspect of the present invention, there is provided a method for controlling damping force through road frequency classification, including executing high-pass filtering of detecting values of wheel vibration input from wheel vibration sensors according to different cutoff frequencies, determining a main frequency of the wheel vibration based on filtered values output from a plurality of high pass filters, determining a maximum amplitude and an amplitude ratio of the wheel vibration based on the filtered values output from the high pass filters, determining whether or not road gripping force is to be controlled based on the determined main frequency of the wheel vibration and the determined maximum amplitude and amplitude ratio of the wheel vibration, and determining the damping force of the dampers of the vehicle based on results of determination as to whether or not the road gripping force is to be controlled and a road roughness.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
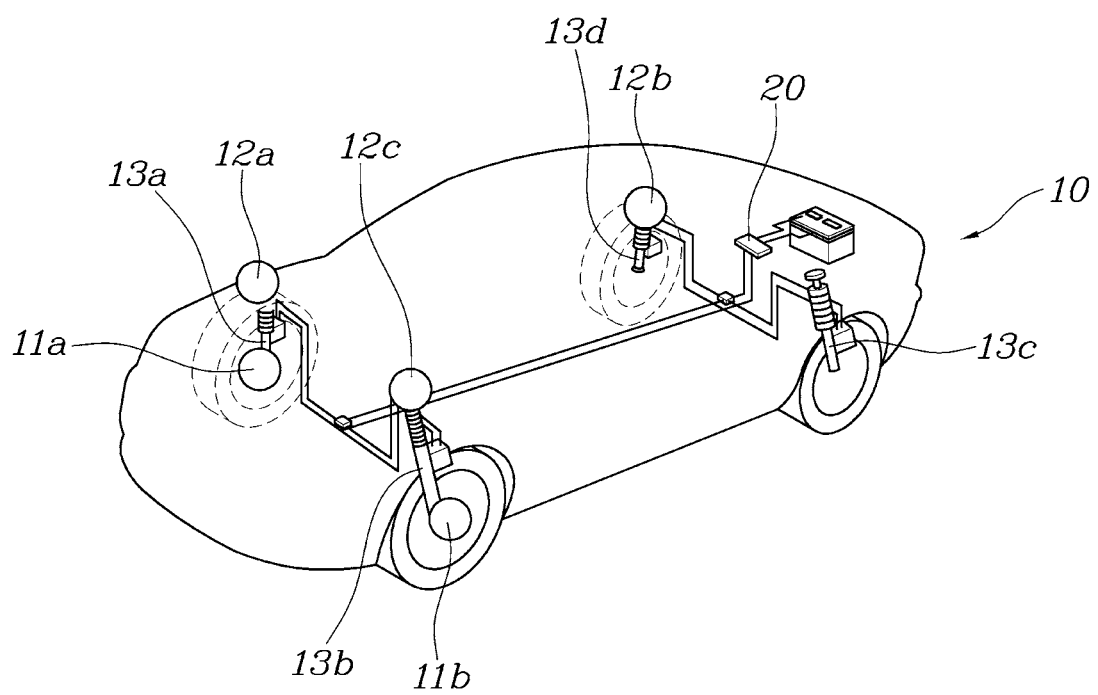
FIG. 1 is a perspective view exemplarily illustrating one example of a vehicle to which an apparatus and method for controlling damping force through road frequency classification according to various exemplary embodiments of the present invention are applied.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Reference will now be made in detail to exemplary embodiments of the present invention, examples of which are illustrated in the accompanying drawings. Wherever possible, the same reference numbers will be used throughout the drawings to refer to the same or like parts.

Hereinafter, apparatuses and methods for controlling damping force through road frequency classification according to various embodiments of the present invention will be described in detail with reference to the accompanying drawings.

FIG. 1 is a perspective view exemplarily illustrating one example of a vehicle to which an apparatus and method for controlling damping force through road frequency classification according to various exemplary embodiments of the present invention are applied.

Referring to FIG. 1, a vehicle 10, to which the apparatus and method for controlling damping force according to various exemplary embodiments of the present invention are applied, may include wheel vibration sensors 11a and 11b provided at wheels of the vehicle to detect vibration of the wheels, body vibration sensors 12a, 12b and 12c, each of which is mounted in one region of a vehicle body to detect vibration of the vehicle body, dampers 13a, 13b, 13c and 13d provided at respective wheels of the vehicle such that the damping force thereof is adjustable, and an electric control unit (ECU) configured to determine and adjust the damping force of the dampers 13a, 13b, 13c and 13d based on the detecting values of the wheel vibration sensors 11a and 11b and the body vibration sensors 12a, 12b and 12c.

The wheel vibration sensors 11a and 11b and the body vibration sensors 12a, 12b and 12c may be implemented as gyro sensors which detect the longitudinal acceleration of the vehicle, and the number thereof may be appropriately adjusted as occasion demands.

The dampers 13a, 13b, 13c and 13d adjust the flow rate of oil supplied thereinto by valves, the open degrees of which are controlled by current, and accordingly, the damping force of the dampers 13a, 13b, 13c and 13d may be determined.

The ECU 20 may receive the detecting values from the wheel vibration sensors 11a and 11b and the body vibration sensors 12a, 12b and 12c, and determine the amounts of current (current values) supplied to the dampers 13a, 13b, 13c and 13d accordingly. The ECU 20 may provide the determined current values to the dampers 13a, 13b, 13c and 13d and thus adjust the damping force of the dampers 13a, 13b, 13c an 13d.

Figure 2:
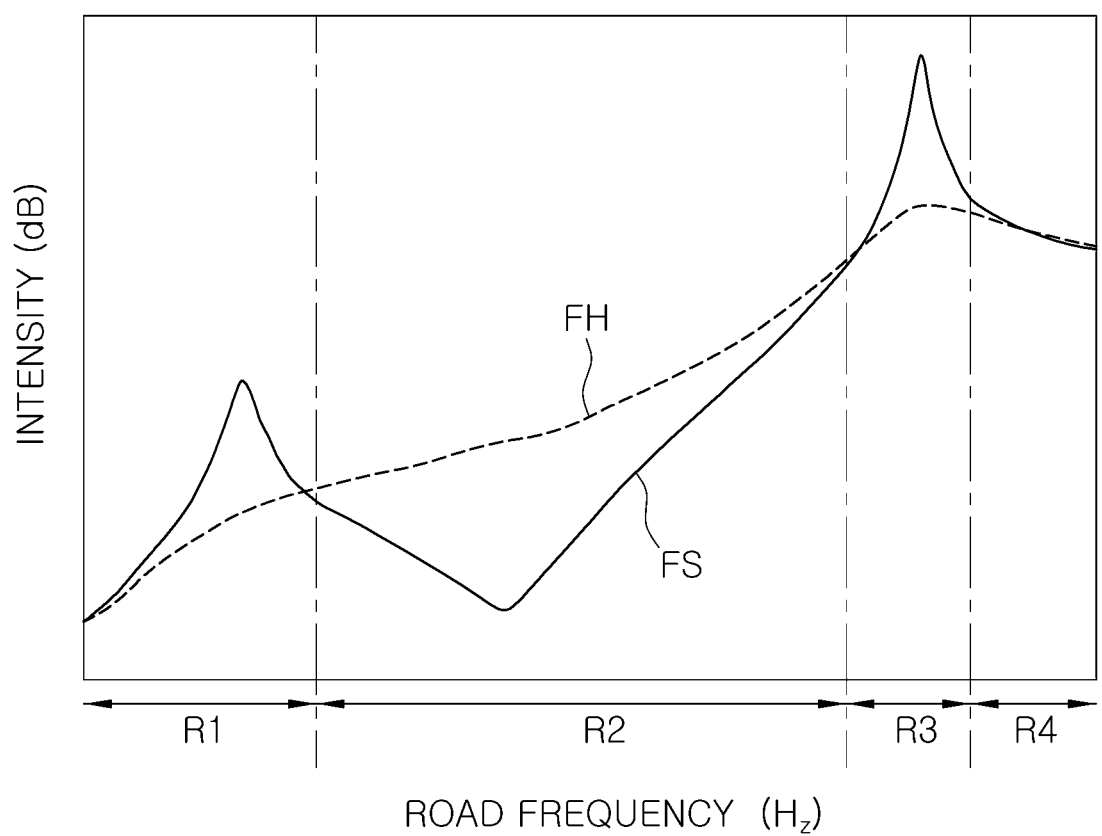
FIG. 2 is a graph showing the relationships between the frequency of a detecting value detected by wheel vibration sensors of a vehicle and the vibration of the vehicle, depending on the constant of dampers.

FIG. 2 is a graph showing the relationships between the frequency of a detecting value detected by wheel vibration sensors of a vehicle and the vibration of the vehicle, depending on the constant of dampers. The graph shown in FIG. 2 represents information regarding road gripping force determined as vibration of wheels, and it will be understood that as the vibration of the wheels is increased, the road gripping force is relatively decreased.

In FIG. 2, a reference mark 'FH' represents a case in which the damper constant has the minimum value, i.e., a case in which the damping force of the dampers is minimized and springs mounted on the dampers are in the hardest state, and a reference mark 'FS' represents a case in which the damper constant has the maximum value, i.e., a case in which the damping force of the dampers is maximized and the springs mounted on the dampers are in the softest state.

As shown in FIG. 2, the intensities of vibration when the springs are set to be in the hardest state and when the springs are set to be in the softest state are different in, respectively regions R1-R4 divided based on frequencies thereof.

First, in the region R1 corresponding to a smooth road driving section having low-level wheel vibration, the intensity of vibration when the springs are set to be in the softest state is higher than the intensity of vibration when the springs are set to be in the hardest state, and it may be confirmed that resonance occurs at a specific frequency when the springs are set to be in the softest state. The present resonance may be regarded as body resonance which occurs in a low frequency domain. Therefore, in the region R1, when the springs are set to be in the hardest state by minimizing the damping force of the dampers, excellent road gripping force may be ensured.

Furthermore, among the regions R2 to R4, in which the wheels vibrate, i.e., corresponding to a rough road driving section, in the region R2, the intensity of vibration when the springs are set to be in the hardest state is higher than the intensity of vibration when the springs are set to be in the softest state. Therefore, in the region R2, when the springs are set to be in the softest state by maximizing the damping force of the dampers, excellent road gripping force may be ensured.

Furthermore, in the region R3, the intensity of vibration when the springs are set to be in the softest state is higher than the intensity of vibration when the springs are set to be in the hardest state, and it may be confirmed that resonance occurs at a specific frequency when the springs are set to be in the softest state, similar to the above-described region R1. Such resonance may be regarded as wheel resonance which occurs in a high frequency domain. Therefore, in the region R3, when the springs are set to be in the hardest state by minimizing the damping force of the dampers, excellent road gripping force may be ensured.

Furthermore, in the region R4, it may be confirmed that almost similar intensities of vibration are represented at all damper constants.

Referring to these results, to ensure excellent road gripping force, it is appropriate for the damping force of the dampers to be determined to set the springs to be in the hardest state in the regions R1 and R3, and the damping force of the dampers is determined to set the springs to be in the softest state in the remaining regions R2 and R4.

Various embodiments of the present invention are characterized in that a road frequency, i.e., the frequency of wheel vibration detected by the wheel vibration sensors 11a and 11b is classified using the detecting values obtained by the wheel vibration sensors 11a and 11b, the one among the regions shown in FIG. 2 to which the road frequency corresponds is determined, and then the damping force of the dampers 13a, 13b, 13c and 13d is controlled to ensure the best road gripping force.

Figure 3:
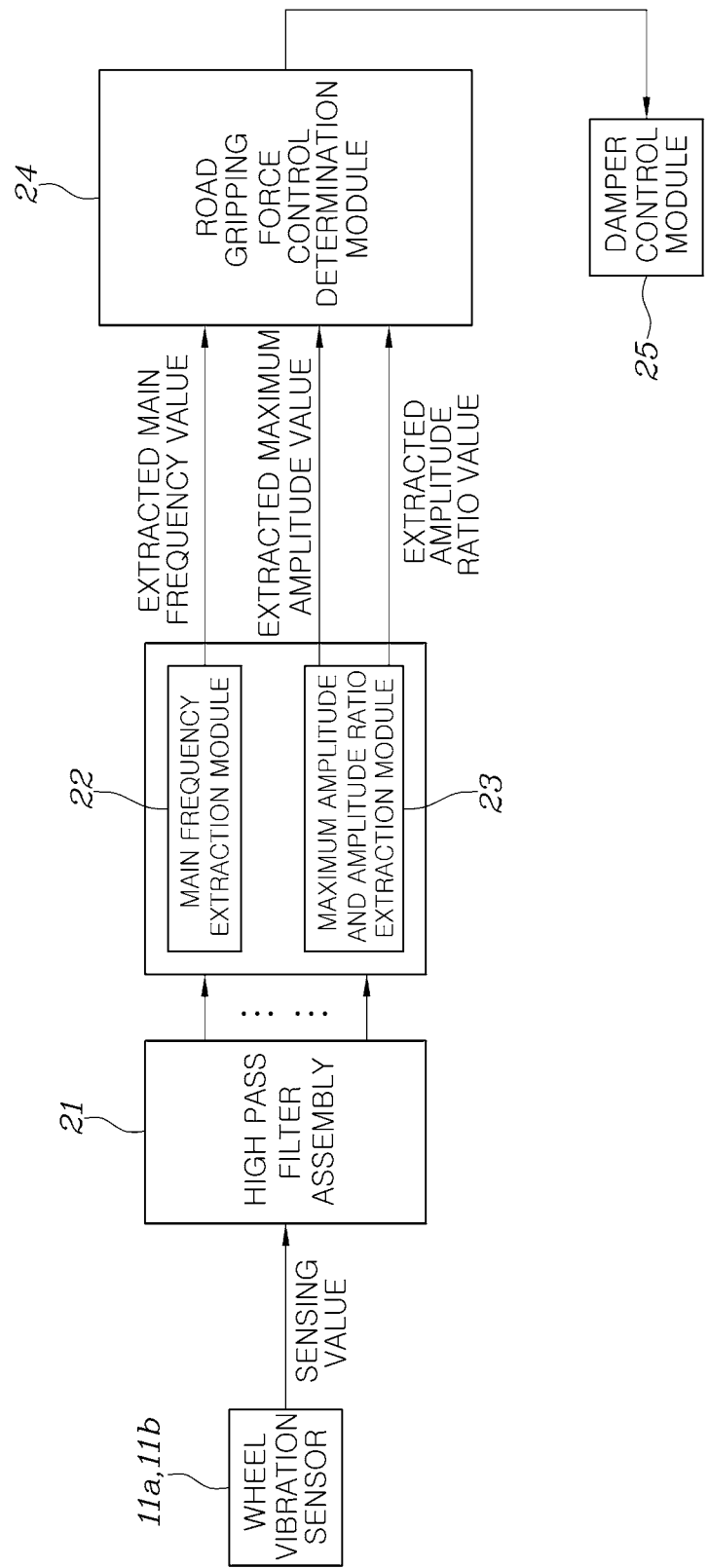
FIG. 3 is a block diagram of the apparatus of controlling damping force through road frequency classification according to various exemplary embodiments of the present invention.

FIG. 3 is a block diagram of the apparatus of controlling damping force through road frequency classification according to various exemplary embodiments of the present invention.

Referring to FIG. 3, the apparatus of controlling damping force through road frequency classification according to various exemplary embodiments of the present invention may include a high pass filter assembly 21 including a plurality of high pass filters which perform high-pass filtering of detecting values of wheel vibration input from the wheel vibration sensors 11a and 11b according to different cutoff frequencies, a main frequency extraction module 22 which determines a main frequency of the wheel vibration based on filtered values output from the high pass filters, a maximum amplitude and amplitude ratio extraction module 23 which determines a maximum amplitude and an amplitude ratio of the wheel vibration based on the filtered values output from the high pass filters, a road gripping force control determination module 24 which determines whether or not road gripping force is to be controlled based on the determined main frequency of the wheel vibration and the determined maximum amplitude and amplitude ratio of the wheel vibration, and a damper control module 25 which determines the damping force of the dampers of the vehicle based on the results of determination by the road gripping force control determination module 24 and road roughness.

In an exemplary embodiment of the present invention, the cutoff frequencies of the high pass filters may be preset.

Figure 4:
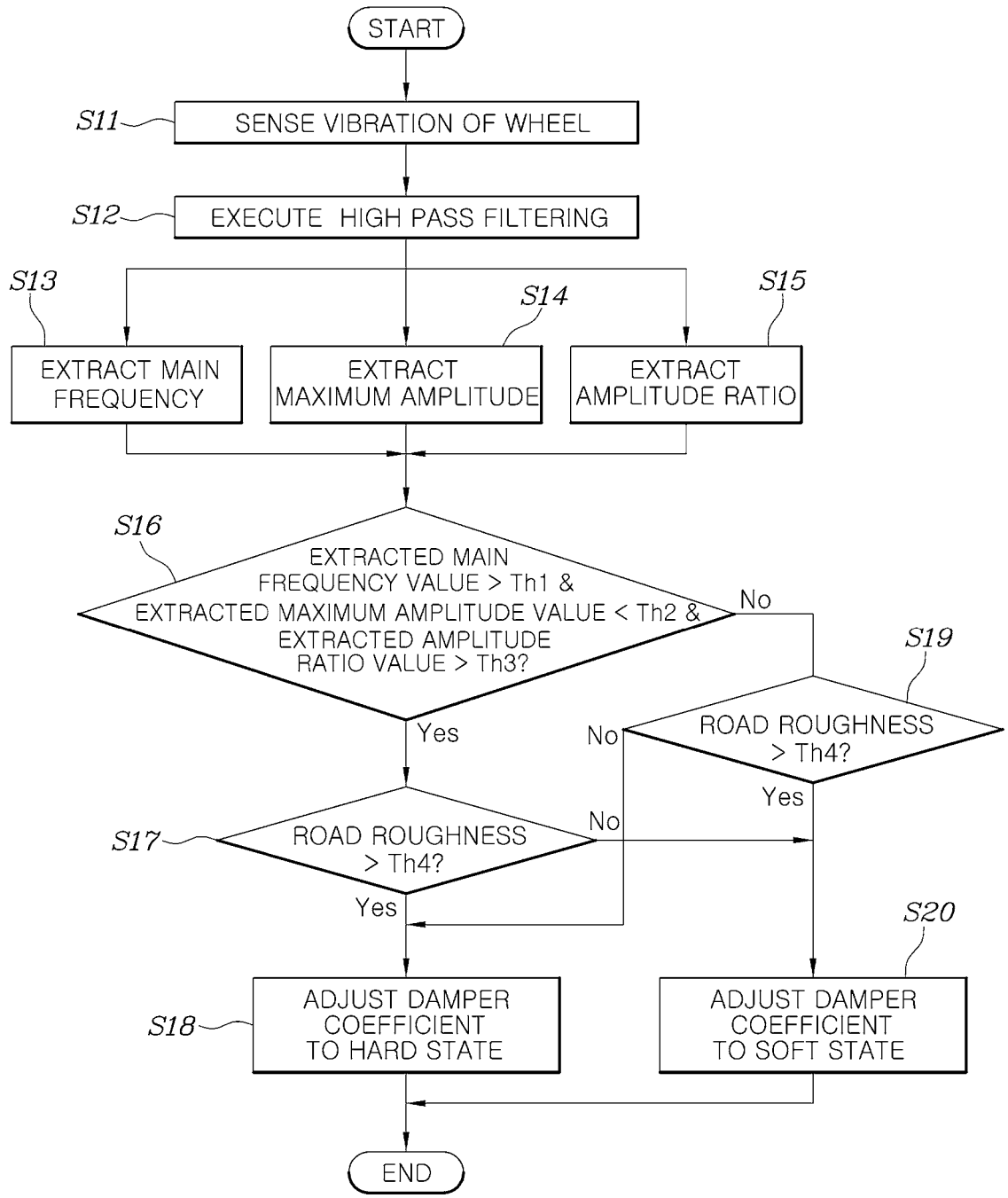
FIG. 4 is a flowchart illustrating the method for controlling damping force according to various exemplary embodiments of the present invention.

FIG. 4 is a flowchart illustrating the method for controlling damping force through road frequency classification according to various exemplary embodiments of the present invention.

Referring to FIG. 4, the method for controlling damping force through road frequency classification according to various exemplary embodiments of the present invention may include detecting, by the wheel vibration sensors 11a and 11b, vibration of the wheels (S11), executing high-pass filtering of detecting values of wheel vibration input from the wheel vibration sensors 11a and 11b according to different cutoff frequencies (S12), determining a main frequency of the wheel vibration based on filtered values output from the high pass filters (S13), determining a maximum amplitude of the wheel vibration based on the filtered values output from the high pass filters (S14), determining an amplitude ratio of the wheel vibration based on the filtered values output from the high pass filters (S15), determining whether or not road gripping force is to be controlled based on the determined main frequency of the wheel vibration and the determined maximum amplitude and amplitude ratio of the wheel vibration (S16), and determining the damping force of the dampers of the vehicle based on the results of determination as to whether or not the road gripping force is to be controlled and a road roughness (S17).

Through the following description of the method for controlling damping force through road frequency classification according to various exemplary embodiments of the present invention, the detailed configuration and operation of the apparatus of controlling damping force will be more clearly understood.

The method for controlling damping force according to various exemplary embodiments of the present invention may start with the detecting of the vibration of the wheels by the wheel vibration sensors 11a and 11b (S11) and the execution of the high-pass filtering of the detecting values input from the wheel vibration sensors 11a and 11b based on the different cutoff frequencies (S12).

The execution of the high-pass filtering (S12) may be performed by the high pass filter assembly 21 of the apparatus of controlling damping force.

Figure 5:
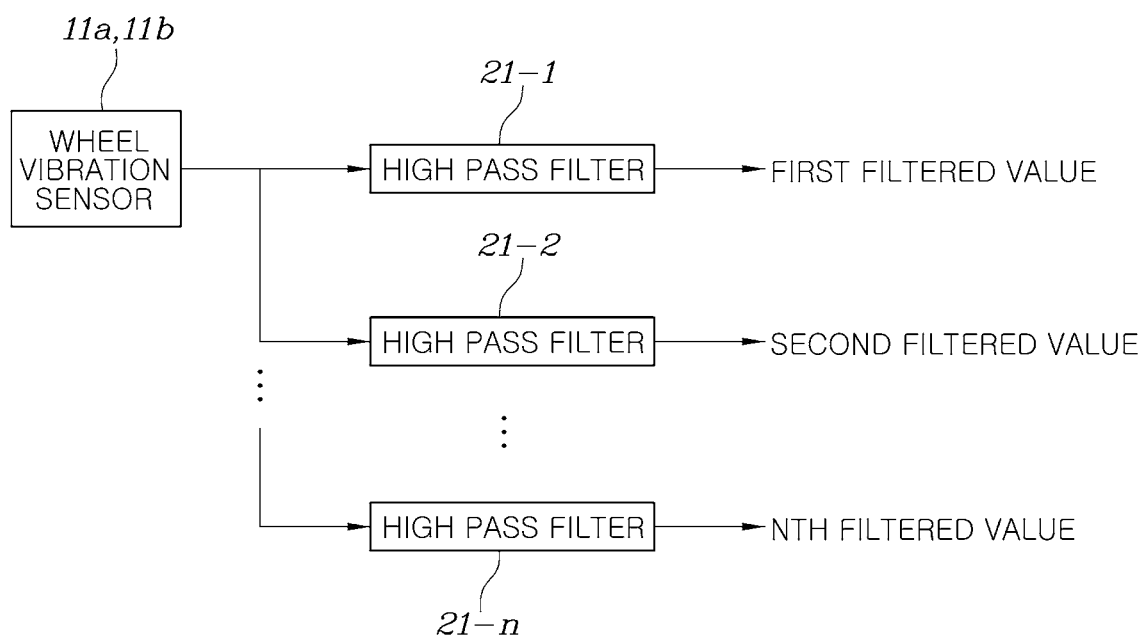
FIG. 5 is a block diagram illustrating the detailed configuration of a high pass filter assembly of the apparatus of controlling damping force according to various exemplary embodiments of the present invention.

FIG. 5 is a block diagram illustrating the detailed configuration of the high pass filter assembly of the apparatus of controlling damping force according to various exemplary embodiments of the present invention.

As shown in FIG. 5, the high pass filter assembly 21 of the apparatus of controlling damping force according to various exemplary embodiments of the present invention may include a plurality of high pass filters 21-1 to 21-n (n being a natural number of 2 or more).

The high pass filters 21-1 to 21-n are provided to reduce the characteristics of signals having frequencies lower than the respective cutoff frequencies thereof, and the cutoff frequencies of the respective high pass filters 21-1 to 21-n and the number of the high pass filters 21-1 to 21-n may be appropriately determined depending on the characteristics of the vehicle in which the wheel vibration sensors 11a and 11b are mounted. For example, the cutoff frequencies of the high pass filters 21-1 to 21-n may be set close to the body resonance frequency or the wheel resonance frequency of the vehicle, and the number of the high pass filters 21-1 to 21-n may be appropriately determined depending on the required accuracy of determination.

Thereafter, the determination of the main frequency of the wheel vibration (S13) may be performed. The determination of the wheel vibration frequency (S13) may be performed by the main frequency extraction module 22 of the apparatus of controlling damping force.

Figure 6:
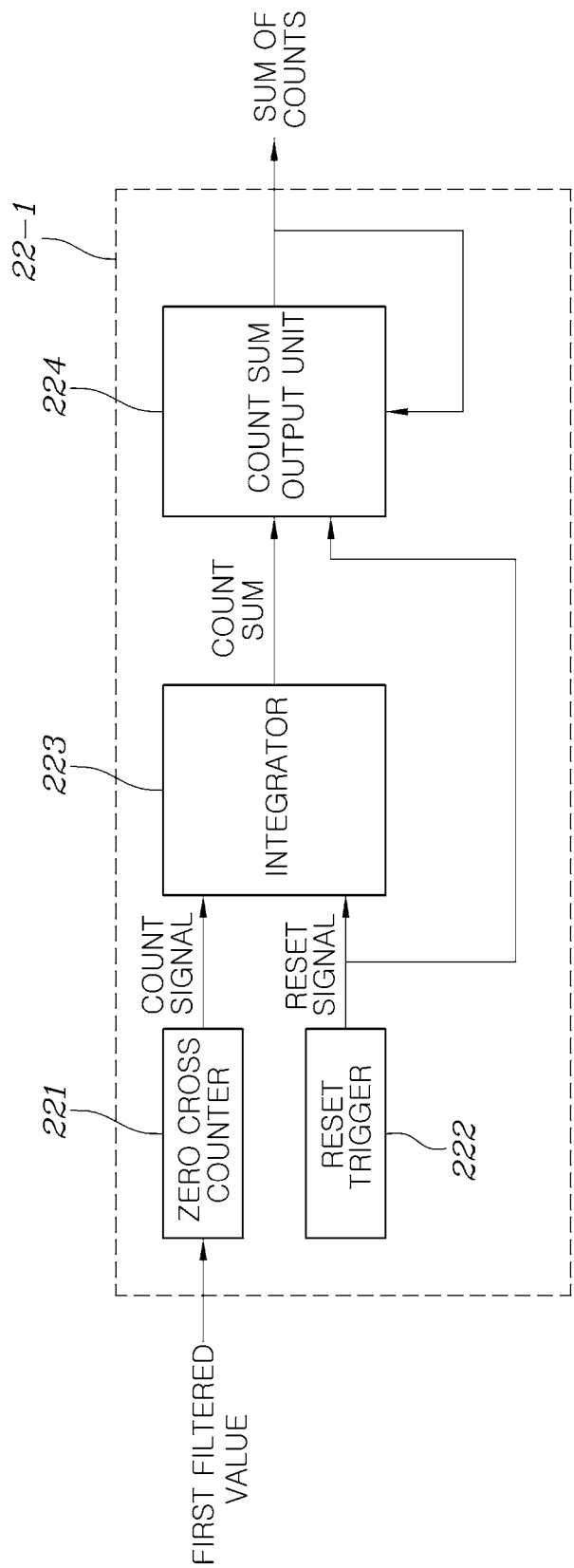
FIG. 6 is a block diagram illustrating, in more detail, a portion of a main frequency extraction module of the apparatus of controlling damping force according to various exemplary embodiments of the present invention.

FIG. 6 is a block diagram illustrating, in more detail, a portion of the main frequency extraction module of the apparatus of damping force according to various exemplary embodiments of the present invention.

FIG. 6 illustrates the portion of the main frequency extraction module 22 which receives and processes a first filtered value. The above configuration of the main frequency extraction module 22 shown in FIG. 6 may be applied to each of filtered values output from the high pass filters 21-1 to 21-n.

Referring to FIG. 6, a main frequency extraction unit 22-1 may include a zero cross counter 221 configured to count the number of times that the filtered value output from the high pass filter 21-1 crosses zero '0', an integrator configured to accumulate a count number, acquired by counting the number of times by the zero cross counter 221, for a predetermined time period, and a count sum output unit 224 configured to update and output a count sum, acquired by accumulating the count number for the predetermined time period, every predetermined time period. Furthermore, the main frequency extraction unit 22-1 may include a reset trigger 222 configured to provide the predetermined time period (i.e., a sampling time), for which the integrator 223 accumulates the count number, to the integrator 223 and the count sum output unit 224.

The reset trigger 222 may output a reset signal every predetermined sampling time, and when the integrator 223 receives the reset signal, the integrator 223 may initialize the accumulated count number and then newly accumulate the count number. Furthermore, the count sum output unit 224 may output a cumulative count sum for the previous sampling time while the reset signal is not received from the reset trigger 222, and output a current cumulative count sum obtained by the integrator 223 when the reset signal is received from the reset trigger 222.

The filtered value output from each of the high pass filters 21-1 to 21-n shown in FIG. 5 may be input to the portion of the main frequency extraction module 22 shown in FIG. 6, and accordingly, a count value of the corresponding filtered value may be generated.

Together with the determination of the main frequency of the wheel vibration (S13), the determination of the maximum amplitude of the wheel vibration (S14) and the determination of the amplitude ratio of the wheel vibration (S15) may be performed. The determination of the maximum amplitude of the wheel vibration (S14) and the determination of the amplitude ratio of the wheel vibration (S15) may be performed by the maximum amplitude and amplitude ratio extraction module 23 of the apparatus of controlling damping force.

Figure 7:
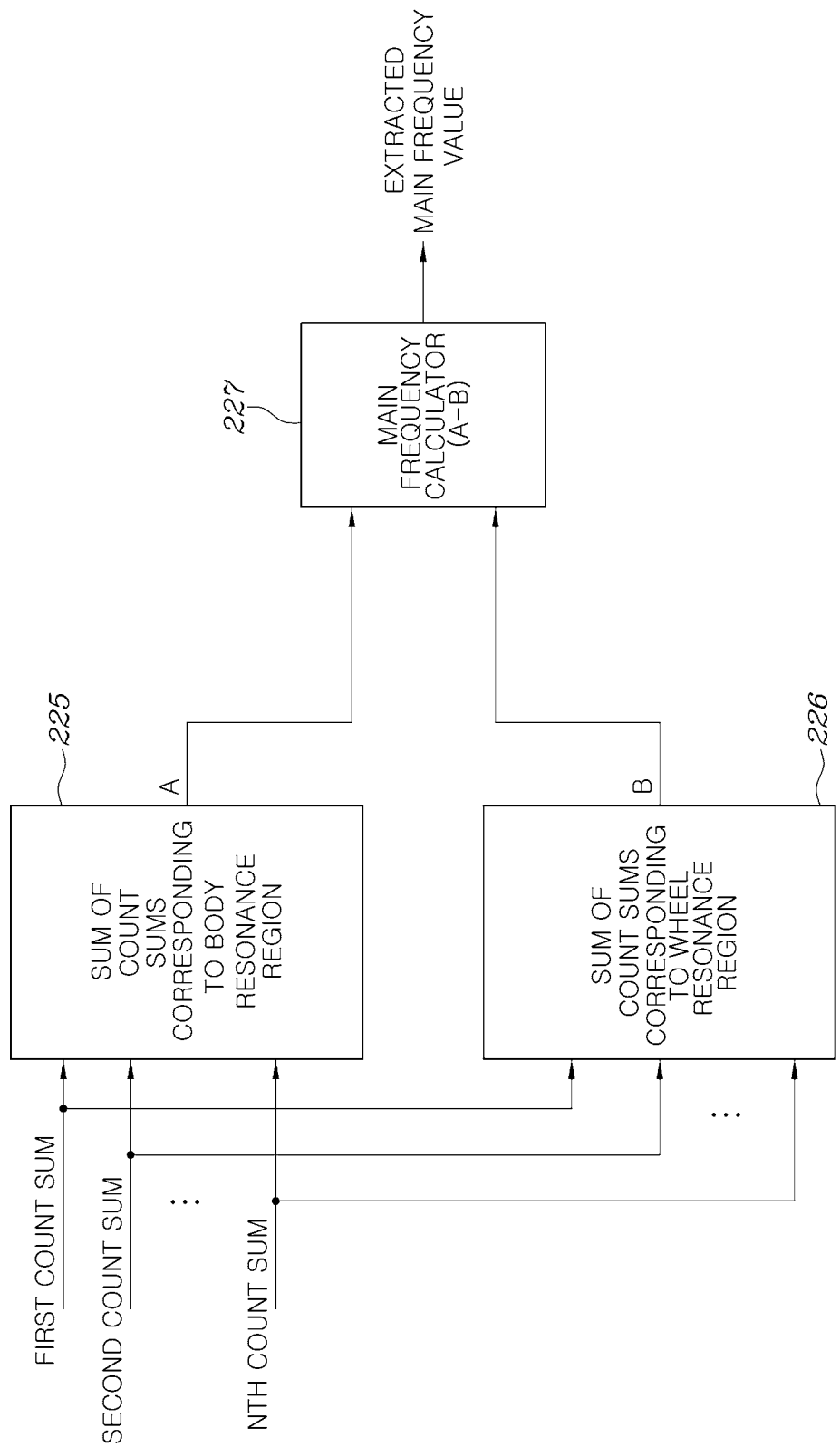
FIG. 7 is a block diagram illustrating, in more detail, the remainder of the main frequency extraction module of the apparatus of controlling damping force according to various exemplary embodiments of the present invention.

FIG. 7 is a block diagram illustrating, in more detail, the remainder of the main frequency extraction module of the apparatus of controlling damping force according to various exemplary embodiments of the present invention.

Referring to FIG. 7, among count sums derived from the respective filtered values through the configuration shown in FIG. 6, the count sums corresponding to a body resonance region (the region R1 in FIG. 2) may be summed and count sums corresponding to a wheel resonance region (the region R3 in FIG. 2) may be summed. Here, division between the body resonance region and the wheel resonance region may be realized by the cutoff frequencies of the high pass filters 21-1 to 21-n used to generate the respective filtered values. For example, the count sums corresponding to the body resonance region of a relatively low frequency, i.e., the region R1 in FIG. 2, may be count sums determined by filtered values generated by the high pass filters, the cutoff frequencies of which belong to the body resonance region. Furthermore, the count sums corresponding to the wheel resonance region of a relatively high frequency, i.e., the region R3 in FIG. 2, may be count sums determined by filtered values generated by the high pass filters, the cutoff frequencies of which are higher than the upper limit of the body resonance region.

The reason for this is that count values generated by filtered values of the high pass filters having low frequencies as the cutoff frequencies thereof, i.e., count values in the body resonance region, may include all of count values due to body resonance and wheel resonance, and count values generated by filtered values of the high pass filters having high frequencies as the cutoff frequencies thereof, i.e., count values in the wheel resonance region, may include only count values due to wheel resonance.

In the low frequency domain, vibration due to body resonance occurs and thus count values may be low. Therefore, when the main frequency is determined to be in the low frequency domain, a result acquired by subtracting a count sum in the wheel resonance region from a count sum in the body resonance region may be a negative value. On the other hand, when the main frequency is determined to be in the high frequency domain in which body resonance is small and wheel resonance is great, the result acquired by subtracting the count sum in the wheel resonance region from the count sum in the body resonance region may be a positive value. That is, the result acquired by subtracting the count sum in the wheel resonance region from the count sum in the body resonance region may be a value to determine the tendency of the main frequency rather than mean the main frequency itself.

Frequencies configured to divide the body resonance region and the wheel resonance region from each other may vary depending on a vehicle, and be predetermined through an experimental method.

A body resonance region sum calculator 225 may sum the count sums corresponding to the body resonance region, among the count sums derived from the respective filtered values, and a wheel resonance region sum calculator 226 may sum the count sums corresponding to the wheel resonance region, among the count sums derived from the respective filtered values. Since the count sum is a value obtained by summing the number of times that the filtered value crosses zero '0' for the predetermine time, the frequency of the corresponding filtered signal may be derived by dividing the count sum by double the predetermined sampling time. Therefore, since frequencies are reflected in the count sum, the range of the count sum corresponding to the body resonance region and the range of the count sum corresponding to the wheel resonance region may be predetermined, and accordingly, the body resonance region sum calculator 225 and the wheel resonance region sum calculator 226 may sum the count sums within the corresponding ranges.

A main frequency calculator 227 may determine the main frequency based on an error between the sum A of the count sums corresponding to the body resonance region and the sum B of the count sums corresponding to the wheel resonance region. The main frequency calculator 227 may determine the main frequency by dividing the error between the sum A of the count sums corresponding to the body resonance region and the sum B of the count sums corresponding to the wheel resonance region by double the predetermined sampling time. A value of the main frequency which is determined and output by the main frequency calculator 227 is expressed as an extracted main frequency value.

Figure 8:
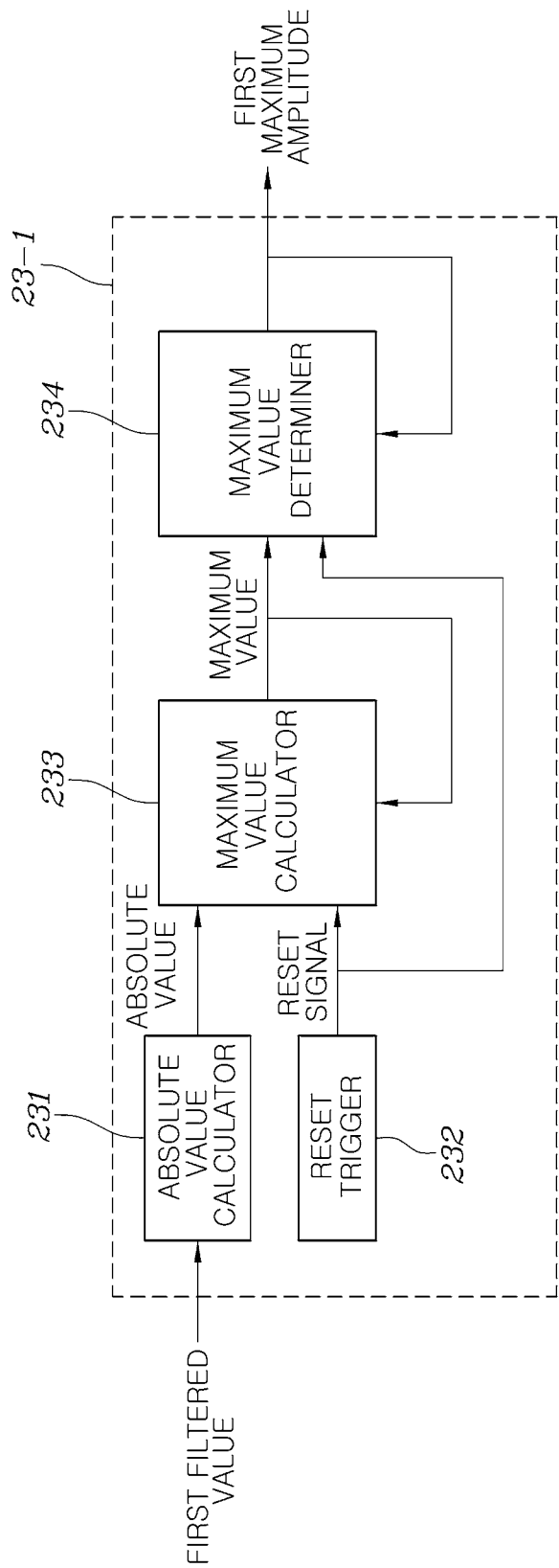
FIG. 8 is a block diagram illustrating, in more detail, a portion of a maximum amplitude and amplitude ratio extraction module of the apparatus of controlling damping force according to various exemplary embodiments of the present invention.

FIG. 8 is a block diagram illustrating, in more detail, a portion of the maximum amplitude and amplitude ratio extraction module of the apparatus of controlling damping force according to various exemplary embodiments of the present invention.

FIG. 8 illustrates the portion of the maximum amplitude and amplitude ratio extraction module 23 which receives and processes the first filtered value. The above configuration of the maximum amplitude and amplitude ratio extraction module 23 shown in FIG. 8 may be applied to each of the filtered values output from the high pass filters 21-1 to 21-n.

Referring to FIG. 8, a maximum amplitude and amplitude ratio extraction unit 23-1 may include an absolute value calculator 231 configured to determine the absolute value of the filtered value output from the high pass filter 21-1, a maximum value calculator 233 configured to determine a maximum value of the absolute value determined by the absolute value calculator 231, and a maximum value determiner 234 configured to update and output the maximum value determined by the maximum value calculator 233 every predetermined sampling time. Furthermore, the maximum amplitude and amplitude ratio extraction unit 23-1 may include a reset trigger 232 configured to provide the predetermined sampling time to the maximum value calculator 233 and the maximum value determiner 234.

The absolute value calculator 231 extracts the absolute value of the filtered value, and the extracted absolute value may be a value corresponding to the amplitude of the filtered value.

The maximum value calculator 233 is reset whenever a reset signal is input thereto and again determines the maximum value, and the maximum value may be output as the larger value obtained by comparing a newly input absolute value with the maximum absolute value determined for the previous sampling time before the latest reset signal was input.

When the reset signal is input to the maximum determiner 234, the maximum value determiner 234 may output the maximum value input from the maximum value calculator 233 until a next reset signal is input to the maximum determiner 234.

The reset trigger 232 may output a reset signal every predetermined sampling time, and the maximum value calculator 233 may output the larger value of an absolute value input for a current sampling time and the maximum absolute value determined for the previous sampling time, and when the maximum value calculator 233 receives the reset signal, may set the maximum value to 0 and then compare an absolute value input for a current sampling time with the maximum absolute value determined for the previous sampling time. Furthermore, the maximum value determiner 234 may output a maximum value determined due to input of the previous reset signal while a new reset signal is not input to the maximum value determiner 234, and update the maximum value with a maximum value input from the maximum value calculator 233 when the new reset signal is input to the maximum value determiner 234.

The filtered value output from each of the high pass filters 21-1 to 21-n shown in FIG. 5 may be input to the portion of the maximum amplitude and amplitude ratio extraction module 23 shown in FIG. 8, and accordingly, the maximum value of the amplitude of the corresponding filtered value may be generated.

Figure 9:
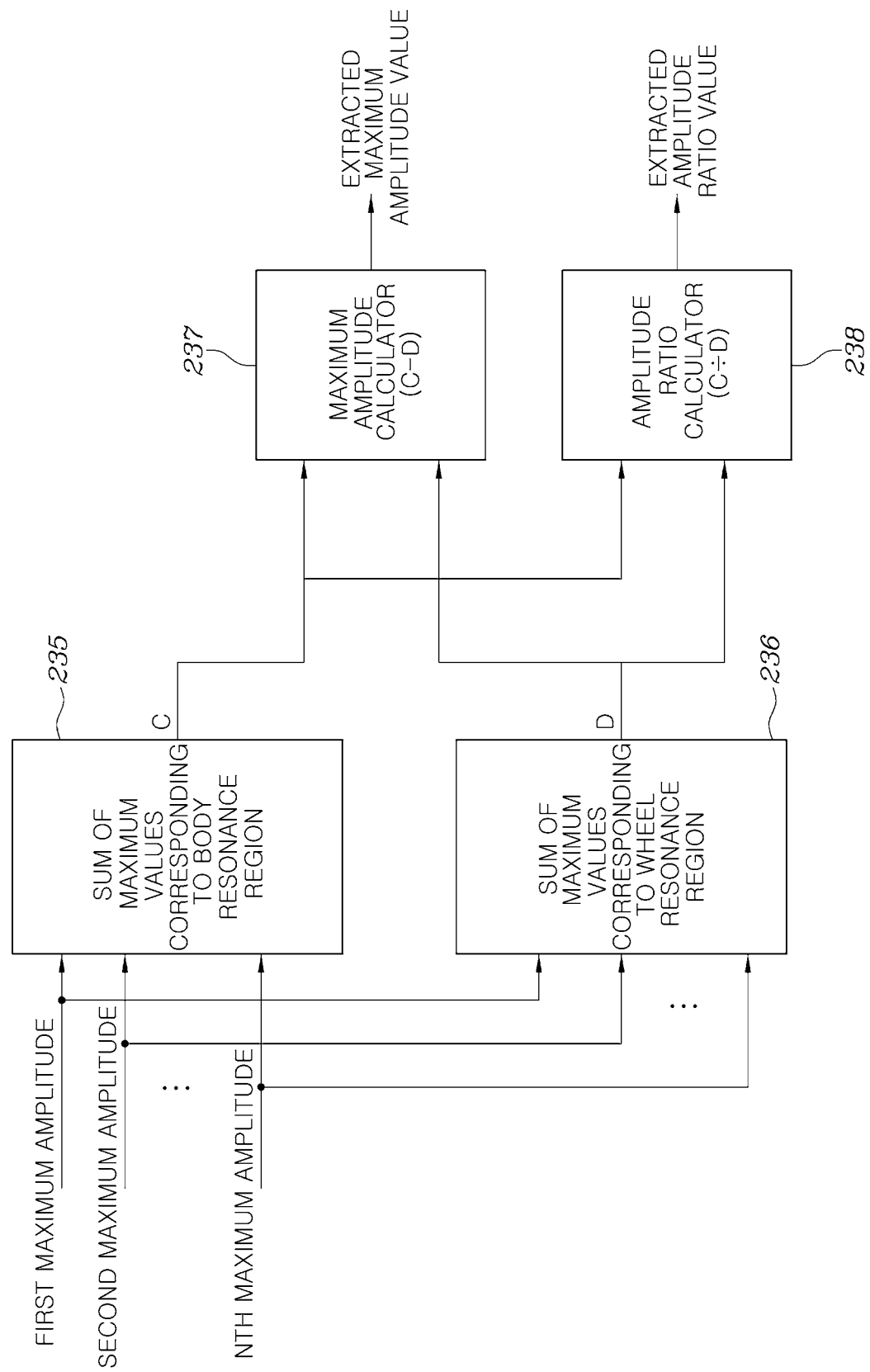
FIG. 9 is a block diagram illustrating, in more detail, the remainder of the maximum amplitude and amplitude ratio extraction module of the apparatus of controlling damping force according to various exemplary embodiments of the present invention.

FIG. 9 is a block diagram illustrating, in more detail, the remainder of the maximum amplitude and amplitude ratio extraction module of the apparatus of controlling damping force according to various exemplary embodiments of the present invention.

Referring to FIG. 9, among the maximum values of amplitudes derived from the respective filtered values through the configuration shown in FIG. 8, the maximum values corresponding to the body resonance region (the region R1 in FIG. 2) may be summed and the maximum values corresponding to the wheel resonance region (the region R3 in FIG. 2) may be summed. A body resonance region sum calculator 235 may sum the maximum values corresponding to the body resonance region, among the maximum values derived from the respective filtered values, and a wheel resonance region sum calculator 236 may sum the maximum values corresponding to the wheel resonance region, among the maximum values derived from the respective filtered values.

In the same manner as in the above description of the main frequency extraction module 22 shown in FIG. 7, the body resonance region and the wheel resonance region may be determined based on the cutoff frequencies of the high pass filters 21-1 to 21-n used to generate the respective filtered values, and frequency bands corresponding to the body resonance region and the wheel resonance region may be predetermined through the experimental method, as described above.

Furthermore, a maximum amplitude calculator 237 may output an extracted maximum amplitude value as a difference between the sum C of the maximum values corresponding to the body resonance region and the sum D of the maximum values corresponding to the wheel resonance region, and an amplitude ratio calculator 238 may output an extracted amplitude ratio value as a ratio of the sum C of the maximum values corresponding to the body resonance region to the sum D of the maximum values corresponding to the wheel resonance region.

Thereafter, the determination as to whether or not the road gripping force is to be controlled (S16) may be performed. The determination as to whether or not the road gripping force is to be controlled (S16) may be performed through the road gripping force control determination module 24 of the apparatus of controlling damping force.

The road gripping force control determination module 24 of FIG. 3 may determine whether or not the road gripping force is to be controlled based on the extracted main frequency value determined by the main frequency extraction module 22 and the extracted maximum amplitude value and the extracted amplitude ratio value determined by the maximum amplitude and amplitude ratio extraction module 23.

For example, the road gripping force control determination module 24 may compare the extracted main frequency determined by the main frequency extraction module 22 with a first predetermined reference value Th1, compare the extracted maximum amplitude value determined by the maximum amplitude and amplitude ratio extraction module 23 with a second predetermined reference value Th2, and compare the extracted amplitude ratio value determined by the maximum amplitude and amplitude ratio extraction module 23 with a third predetermined reference value Th3. When the extracted main frequency is greater than the first predetermined reference value Th1, the extracted maximum amplitude value is smaller than the second predetermined reference value Th2 and the extracted amplitude ratio value is greater than the third predetermined reference value Th3, the road gripping force control determination module 24 may determine that the road gripping force is to be controlled. Here, the road gripping force is controlled to prevent the road gripping force from being deteriorated on a road having high road roughness, such as a rough road.

Here, the extracted main frequency value is configured as an index value to check a road surface condition, but it is difficult to accurately check the road surface condition using only the extracted main frequency value. The extracted main frequency value may have a positive value due to high-frequency wheel vibration on a rough road, but if there is little low-frequency body vibration and thus wheel vibration alone occurs on a smooth road, such as an asphalt road, the extracted main frequency value may have a positive value.

In the instant case, to distinguish the smooth road and the rough road from each other, the road gripping force control determination module 24 may use the extracted maximum amplitude value and the extracted amplitude ratio value determined by the maximum amplitude and amplitude ratio extraction module 23, in addition to the extracted main frequency determined by the main frequency extraction module 22.

For example, on a rough road, a high-amplitude body vibration is generated, and thus, the extracted main frequency value may be a positive value and the extracted maximum amplitude value and the extracted amplitude ratio value may be great. On the other hand, on a smooth road, the extracted main frequency value is a positive value, but no low-frequency body vibration is generated and thus the extracted maximum amplitude value and the extracted amplitude ratio value may be small.

Accordingly, the extracted main frequency value, the extracted maximum amplitude value and the extracted amplitude ratio value is configured as indices to check a road surface condition, and whether or not road gripping force is controlled may be determined by respectively comparing these values with the first to third predetermined reference values.

Thereafter, the determination of the damping force of the dampers of the vehicle (S17) may be performed. The determination of the damping force of the dampers of the vehicle (S17) may be performed by the damper control module 25 of the apparatus of controlling damping force.

When the road gripping force control determination module 24 may determine that the road gripping force is to be controlled (S16), the damper control module 25 may control the dampers based on road roughness. By reflecting the characteristics of the road gripping force shown in FIG. 2, when the road gripping force control determination module 24 determines that the road gripping force is to be controlled (Yes in S16) and the road roughness is greater than a fourth predetermined reference value Th4 (Yes in S17), the damper control module 25 may determine the vehicle to be in a driving condition corresponding to the region R3 of FIG. 2 and change the damper coefficient to realize the hard state in which the damping force of the dampers is decreased (S18).

Otherwise, when the road gripping force control determination module 24 determines that the road gripping force is not to be controlled (No in S16) and the road roughness is not greater than the fourth predetermined reference value Th4 (No in S19), the damper control module 25 may determine the vehicle to be in a driving condition corresponding to the region R1 of FIG. 2 and change the damper coefficient to realize the hard state in which the damping force of the dampers is decreased (S18).

Alternatively, when the road gripping force control determination module 24 determines that the road gripping force is not to be controlled (No in S16) and the road roughness is greater than the fourth predetermined reference value Th4 (Yes in S19), the damper control module 25 may determine the vehicle to be in a driving condition corresponding to the region R2 of FIG. 2 and change the damper coefficient to realize the soft state in which the damping force of the dampers is increased (S20).

For the present operation, the fourth reference value Th4 may correspond to a road roughness value to distinguish the region R1 and the region R2 from each other.

The road roughness value applied to the present invention may be acquired through various sensors which are well known in the art or through an algorithm for determining road roughness.

As described above, in the apparatus and method for controlling damping force through road frequency classification according to various embodiments of the present invention, whether or not control for ensuring road gripping force is to be performed may be determined based on results of the frequencies and amplitudes of detecting values of wheel vibration derived by analyzing the detecting values from wheel vibration sensors, and the damping force of the dampers of the vehicle may be controlled based on the results of the determination.

Therefore, the apparatus and method for controlling damping force through road frequency classification according to the exemplary embodiments of the present invention may allow the vehicle to be stably driven through adjustment of the damping force of the dampers to ensure road gripping force, when the road gripping force in a rough road section is required.

As is apparent from the above description, in an apparatus and method for controlling damping force through road frequency classification according to various exemplary embodiments of the present invention, whether or not control for ensuring road gripping force is to be performed may be determined based on the results of the frequencies and amplitudes of detecting values of wheel vibration derived by analyzing the detecting values from wheel vibration sensors, and damping force of dampers of a vehicle may be controlled based on results of the determination.

Therefore, the apparatus and method for controlling damping force through road frequency classification may allow the vehicle to be stably driven through adjustment of the damping force of the dampers to ensure road gripping force, when the road gripping force in a rough road section is required.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle comprising: a plurality of wheel vibration sensors configured to detect vibration of each wheel; and an electronic control unit (ECU) configured to: receive detecting values of wheel vibration from the wheel vibration sensors; perform high-pass filtering of detecting values of wheel vibration according to different cutoff frequencies; determine a main frequency of the wheel vibration according to a plurality of filtered detecting values; determine a maximum amplitude and an amplitude ratio of the wheel vibration based on the filtered detecting values determine whether road gripping force is to be controlled according to the determined main frequency of the wheel vibration and the determined maximum amplitude and amplitude ratio of the wheel vibration; determine a damping force of dampers of the vehicle according to results of determination whether the road gripping force is to be controlled a road roughness; and control the dampers of the vehicle based on the damping force.

2. The vehicle according to claim 1, wherein the ECU includes: a plurality of zero cross counters, each of which is configured to count a number of times that a filtered value output from a corresponding one of a plurality of high pass filters crosses zero '0'; a plurality of integrators, each of which is configured to cumulatively sum a count number, acquired by counting the number of times by a corresponding one of the zero cross counters, for a predetermined sampling time; a plurality of count sum output units, each of which is configured to update and output a count sum, acquired by cumulatively summing the count number by a corresponding one of the plurality of integrators, each sampling time; a body resonance region sum calculator configured to sum count sums corresponding to a body resonance region of the vehicle, among the count sums output from the plurality of count sum output units; a wheel resonance region sum calculator configured to sum count sums corresponding to a wheel resonance region of the vehicle, among the count sums output from the plurality of count sum output units; and a main frequency calculator configured to derive the main frequency of the wheel vibration according to a difference between a sum of the count sums corresponding to the body resonance region of the vehicle and a sum of the count sums corresponding to the wheel resonance region of the vehicle.

3. The vehicle according to claim 2, wherein the main frequency calculator derives the main frequency by dividing the difference between the sum of the count sums corresponding to the body resonance region and the sum of the count sums corresponding to the wheel resonance region by double the predetermined sampling time.

4. The vehicle according to claim 1, wherein the ECU includes: a plurality of absolute value calculators, each of which is configured to determine an absolute value of a corresponding one of the filtered detecting values; a plurality of maximum value calculators, each of which is configured to determine a maximum value of the absolute value determined by a corresponding one of the absolute value calculators; a plurality of maximum value determiners, each of which is configured to update and output a maximum value determined by a corresponding one of the maximum value calculators each predetermined sampling time; a body resonance region sum calculator configured to sum maximum values corresponding to a body resonance region of the vehicle, among the maximum values output from the maximum value determiners; a wheel resonance region sum calculator configured to sum maximum values corresponding to a wheel resonance region of the vehicle, among the maximum values output from the maximum value determiners; a maximum amplitude calculator configured to determine the maximum amplitude of the wheel vibration according to a difference between a sum of the maximum values corresponding to the body resonance region of the vehicle and a sum of the maximum values corresponding to the wheel resonance region of the vehicle; and an amplitude ratio calculator configured to determine the amplitude ratio of the wheel vibration according to a ratio of the sum of the maximum values corresponding to the body resonance region of the vehicle to the sum of the maximum values corresponding to the wheel resonance region of the vehicle.

5. The vehicle according to claim 1, wherein the ECU determines that the road gripping force is to be controlled, when the main frequency of the wheel vibration determined by the ECU is greater than a first predetermined reference value, the maximum amplitude of the wheel vibration determined by the ECU is smaller than a second predetermined reference value and the amplitude ratio of the wheel vibration determined by the ECU is greater than a third predetermined reference value.

6. The vehicle according to claim 5, wherein the ECU changes the damping force of the dampers to a first state in which the damping force is decreased, when the ECU determines that the road gripping force is to be controlled and the road roughness is greater than a fourth predetermined reference value.

7. The vehicle according to claim 5, wherein the ECU changes the damping force of the dampers to a first state in which the damping force is decreased, when the ECU determines that the road gripping force is not to be controlled and the road roughness is not greater than a fourth predetermined reference value.

8. The vehicle according to claim 5, wherein the ECU changes the damping force of the dampers to a second state in which the damping force is increased, when the ECU determines that the road gripping force is not to be controlled and the road roughness is greater than a fourth predetermined reference value.

9. The vehicle according to claim 1, wherein the ECU changes the damping force of the dampers to a first state in which the damping force is decreased, when the ECU determines that the road gripping force is to be controlled and the road roughness is greater than a predetermined reference value.

10. The vehicle according to claim 1, wherein the ECU changes the damping force of the dampers to a first state in which the damping force is decreased, when the ECU determines that the road gripping force is not to be controlled and the road roughness is not greater than a predetermined reference value.

11. The vehicle according to claim 1, wherein the ECU changes the damping force of the dampers to a second state in which the damping force is increased, when the ECU determines that the road gripping force is not to be controlled and the road roughness is greater than a predetermined reference value.

12. A method for controlling a damping force through road frequency classification, the method comprising: receiving detecting values of wheel vibration from a plurality of wheel vibration sensors, executing high-pass filtering of detecting values of wheel vibration input from wheel vibration sensors according to different cutoff frequencies; determining a main frequency of the wheel vibration according to filtered detecting values output from a plurality of high pass filters of an electronic control unit (ECU); determining a maximum amplitude and an amplitude ratio of the wheel vibration according to the filtered detecting values output from the plurality of high pass filters; determining whether road gripping force is to be controlled according to the determined main frequency of the wheel vibration and the determined maximum amplitude and amplitude ratio of the wheel vibration; determining the damping force of dampers of a vehicle according to results of determination as to whether the road gripping force is to be controlled and a road roughness, and controlling the dampers of the vehicle based on the damping force.

13. The method according to claim 12, wherein the determining the main frequency of the wheel vibration includes:
    counting, by each of a plurality of zero cross counters, a number of times that a filtered value output from a corresponding one of the plurality of high pass filters crosses zero '0';
    cumulatively summing, by each of a plurality of integrators, a count number, acquired by counting a number of times by a corresponding one of the zero cross counters, for a predetermined sampling time;
    updating and outputting, by each of a plurality of count sum output units, a count sum, acquired by cumulatively summing the count number by a corresponding one of the plurality of integrators, each sampling time;
    summing, by a body resonance region sum calculator, count sums corresponding to a body resonance region of the vehicle, among the count sums output from the plurality of count sum output units;
    summing, by a wheel resonance region sum calculator, count sums corresponding to a wheel resonance region of the vehicle, among the count sums output from the plurality of count sum output units; and
    deriving, by a main frequency calculator, the main frequency of the wheel vibration according to a difference between a sum of the count sums corresponding to the body resonance region of the vehicle and a sum of the count sums corresponding to the wheel resonance region of the vehicle.

14. The method according to claim 13, wherein the main frequency calculator derives the main frequency by dividing the difference between the sum of the count sums corresponding to the body resonance region and the sum of the count sums corresponding to the wheel resonance region by double the predetermined sampling time.

15. The method according to claim 12, wherein the determining the maximum amplitude and the amplitude ratio of the wheel vibration according to the filtered detecting values output from the plurality of high pass filters includes:
  determining, by each of a plurality of absolute value calculators, an absolute value of a corresponding one of the filtered detecting values;
  determining, by each of a plurality of maximum value calculators, a maximum value of the absolute value determined by a corresponding one of the absolute value calculators;
  updating and outputting, by each of a plurality of maximum value determiners, a maximum value determined by a corresponding one of the maximum value calculators each predetermined sampling time;
  summing, by a body resonance region sum calculator, maximum values corresponding to a body resonance region of the vehicle, among maximum values output from the maximum value determiners;
  summing, by a wheel resonance region sum calculator, maximum values corresponding to a wheel resonance region of the vehicle, among the maximum values output from the maximum value determiners;
  determining, by a maximum amplitude calculator, the maximum amplitude of the wheel vibration according to a difference between a sum of the maximum values corresponding to the body resonance region of the vehicle and a sum of the maximum values corresponding to the wheel resonance region of the vehicle; and
  determining, by an amplitude ratio calculator, the amplitude ratio of the wheel vibration according to a ratio of the sum of the maximum values corresponding to the body resonance region of the vehicle to the sum of the maximum values corresponding to the wheel resonance region of the vehicle.

16. The method according to claim 12, wherein, in the determining whether or not the road gripping force is to be controlled, the road gripping force is determined to be controlled, when the main frequency of the wheel vibration determined by the ECU is greater than a first predetermined reference value, the maximum amplitude of the wheel vibration determined by the ECU is smaller than a second predetermined reference value and the amplitude ratio of the wheel vibration determined by ECU is greater than a third predetermined reference value.

17. The method according to claim 12, wherein, in the determining the damping force of the dampers, the damping force of the dampers is changed to a first state in which the damping force is decreased, when the ECU determines that the road gripping force is to be controlled and the road roughness is greater than a fourth predetermined reference value.

18. The method according to claim 12, wherein, in the determining the damping force of the dampers, the damping force of the dampers is changed to a first state in which the damping force is decreased, when the ECU determines that the road gripping force is not to be controlled and the road roughness is not greater than a fourth predetermined reference value.

19. The method according to claim 12, wherein, in the determining the damping force of the dampers, the damping force of the dampers is changed to a second state in which the damping force is increased, when the ECU determines that the road gripping force is not to be controlled and the road roughness is greater than a fourth predetermined reference value.

* * * * *